US012600163B2

(12) United States Patent
Usui et al.

(10) Patent No.: US 12,600,163 B2
(45) Date of Patent: Apr. 14, 2026

(54) COSMETIC MATERIAL AND PRODUCTION METHOD FOR COSMETIC MATERIAL

(71) Applicant: Dai Nippon Printing Co., Ltd., Tokyo (JP)

(72) Inventors: Hironaga Usui, Wako (JP); Yoshio Sukegawa, Fujimi (JP); Hideo Tanaka, Toshima-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 843 days.

(21) Appl. No.: 17/442,933

(22) PCT Filed: Mar. 17, 2020

(86) PCT No.: PCT/JP2020/011672
§ 371 (c)(1),
(2) Date: Sep. 24, 2021

(87) PCT Pub. No.: WO2020/203251
PCT Pub. Date: Oct. 8, 2020

(65) Prior Publication Data

US 2022/0185008 A1 Jun. 16, 2022

(30) Foreign Application Priority Data

Mar. 29, 2019 (JP) ................................ 2019-067766

(51) Int. Cl.
*B44F 11/04* (2006.01)
*B44C 1/24* (2006.01)
(Continued)

(52) U.S. Cl.
CPC ................ *B44F 11/04* (2013.01); *B44C 1/24* (2013.01); *B44F 11/02* (2013.01); *B44F 11/06* (2013.01)

(58) Field of Classification Search
CPC ........... B44F 11/04; B44F 11/02; B44F 11/06; B44C 1/24
See application file for complete search history.

(56) References Cited

U.S. PATENT DOCUMENTS 5,804,285 A 9/1998 Kobayashi et al.
6,579,593 B1* 6/2003 Mori ........................ B62D 1/06 74/552
(Continued)

FOREIGN PATENT DOCUMENTS

CN 107160696 A 9/2017
CN 109153282 A 1/2019
(Continued)

OTHER PUBLICATIONS

English translation of 2019-043086 from JPlatPat (Year: 2019).*
(Continued)

*Primary Examiner* — Alicia J Weydemeyer
*Assistant Examiner* — Laura B Figg
(74) *Attorney, Agent, or Firm* — Troutman Pepper Locke LLP; James E. Armstrong, IV

(57) ABSTRACT

A decorative material that can give an excellent three-dimensional effect, has a large change in shadowed parts depending on observation angle, and has advanced design aesthetics is provided. A decorative material, wherein on a first principal surface side, a plurality of independent closed regions each having a groove-shaped parallel recess and projection pattern are arranged, depths of recesses of the groove-shaped parallel recess and projection patterns vary in at least some of the closed regions, and a coloring agent is filled in at least part in a depth direction of recesses of the groove-shaped parallel recess and projection pattern in each of the closed regions.

7 Claims, 5 Drawing Sheets

(51) Int. Cl.
*B44F 11/02* (2006.01)
*B44F 11/06* (2006.01)

(56) References Cited

U.S. PATENT DOCUMENTS

| | | | | |
|---|---|---|---|---|
| 2006/0117691 | A1* | 6/2006 | Luetgert | E06B 3/7001 52/313 |
| 2009/0305003 | A1* | 12/2009 | Nagashima | B60R 13/005 427/535 |
| 2017/0217123 | A1 | 8/2017 | Kataoka et al. | |
| 2018/0111227 | A1* | 4/2018 | Shimada | B23K 26/0006 |

FOREIGN PATENT DOCUMENTS

| | | | | |
|---|---|---|---|---|
| EP | 3623168 | A1 | | 3/2020 |
| JP | S54-56654 | A | | 5/1979 |
| JP | S54-153863 | A | | 12/1979 |
| JP | H05-131800 | A | | 5/1993 |
| JP | 3011902 | U | | 6/1995 |
| JP | H08-1895 | A | | 1/1996 |
| JP | H0852849 | A | * | 2/1996 |
| JP | 2000-6598 | A | | 1/2000 |
| JP | 2001-191697 | A | | 7/2001 |
| JP | 2001-353784 | A | | 12/2001 |
| JP | 2005-313129 | A | | 11/2005 |
| JP | 2016-10875 | A | | 1/2016 |
| JP | 2019043086 | A | * | 3/2019 |
| WO | 2018208126 | A1 | | 11/2018 |

OTHER PUBLICATIONS

English translation of JP H08-52849 (Year: 1996).*
Office Action dated Sep. 14, 2022, issued for Australian Patent Application No. 2020254442.
Supplementary European Search Report dated Dec. 6, 2022, issued for European Patent Application No. 20784982.9.

* cited by examiner

COSMETIC MATERIAL AND PRODUCTION METHOD FOR COSMETIC MATERIAL

TECHNICAL FIELD

The present invention relates to a decorative material and a production method for decorative material.

BACKGROUND ART

Decorative materials are widely used to decorate interior and exterior materials and the like of furniture, fittings and the like. Widely used decorative materials are those provided with patterns to enhance the design aesthetics.

There are various patterns that are given to the decorative materials, and there are cited mosaic patterns such as stone patterns and tile patterns, for example. As the decorative materials that are given mosaic patterns such as stone patterns, the decorative materials in Patent Literature 1 and 2 are cited.

CITATION LIST

Patent Literature

PTL1: JP 2001-353789 A
PTL2: JP 2001-191697 A

SUMMARY OF INVENTION

Technical Problem

Patent Literature 1 discloses a production method of a decorative sheet made by thermocompression-bonding a base material with different color patterns printed on a surface partitioned by grooves, and a transparent coating material with different color patterns printed on it via an adhesive. The production method of the decorative material of Patent Literature 1 has the aim to obtain a luxurious pattern by layering colors and obtain a clean printed surface that won't fade by coating the printed surface with the transparent coating material.

However, the decorative material of Patent Literature 1 has the disadvantage that it lacks three-dimensional effect of the stone pattern. Furthermore, the decorative material of Patent Literature 1 has the disadvantage that it is necessary to align two sheets (the base material and the transparent coating material) in the process of producing the decorative material, and the yield tends to decrease.

Patent Literature 2 discloses a decorative material with a pseudo-three-dimensional effect comprising a pseudo-three-dimensional stone pattern made by overlapping a stone pattern and a pseudo-three-dimensional pattern made by partitioning a plane by polygons each in an arbitrary shape and size and filling parts of the respective polygons with a dark color, by only forming patterns by printing without forming a recess and projection shape by embossing or the like.

However, the decorative material of Patent Literature 2 does not have a three-dimensional effect at a high level, and there is little change in the shadowed parts in the plane even if the observation direction is changed, so that the decorative material of Patent Literature 2 does not have advanced design aesthetics.

The present invention has an object to provide a decorative material with advanced design aesthetics, which is capable of giving an excellent three-dimensional effect, and has a large change in shadowed parts depending on an observation angle and a production method of the decorative material.

Solution to Problem

In order to solve the above described problem, the present inventors provide [1] to [10] below.

[1] A decorative material, wherein on a first principal surface side of the decorative material, a plurality of independent closed regions each comprising a groove-shaped parallel recess and projection pattern are arranged, depths of recesses of the groove-shaped parallel recess and projection patterns vary in at least some of the closed regions, and a coloring agent is filled in at least part in a depth direction of recesses of the groove-shaped parallel recess and projection pattern in each of the closed regions.

[2] The decorative material as set forth in [1], wherein a ratio of closed regions in which the depths of the recesses of the groove-shaped parallel recess and projection patterns vary in the closed regions to all the closed regions is 80% or more based on a number of closed regions.

[3] The decorative material as set forth in [1] or [2], wherein at least some of adjacent closed regions satisfy one or more selected from the group consisting of (a) to (d) as follows:

(a) When a width of a recess of a groove-shaped parallel recess and projection pattern in an arbitrary closed region A is defined as $X_A$, and a width of a recess of a groove-shaped parallel recess and projection pattern in an arbitrary closed region B adjacent to the closed region A is defined as $X_B$, $X_A \neq X_B$ is established.

(b) When a width of a projection of the groove-shaped parallel recess and projection pattern in the arbitrary closed region A is defined as $Y_A$, and a width of a projection of the groove-shaped parallel recess and projection pattern in the arbitrary closed region B adjacent to the closed region A is defined as $Y_B$, the $X_A$, the $Y_A$, the $X_B$, and the $Y_B$ satisfy $Y_A/X_A \neq Y_B/X_B$.

(c) When an average of depths of recesses of the groove-shaped parallel recess and projection pattern in the arbitrary closed region A is defined as $Z_A$, and an average of depths of recesses of the groove-shaped parallel recess and projection pattern in the arbitrary closed region B adjacent to the closed region A is defined as $Z_B$, $Z_A \neq Z_B$ is established.

(d) When an extending direction of the groove-shaped parallel recess and projection pattern in the arbitrary closed region A is defined as $D_A$, and an extending direction of the groove-shaped parallel recess and projection pattern in the arbitrary closed region B adjacent to the closed region A is defined as $D_B$, the $D_A$ and the $D_B$ are non-parallel with each other.

[4] The decorative material as set forth in [3], wherein at least some of the adjacent closed regions satisfy the (d).

[5] The decorative material as set forth in [4], wherein an angle formed by the $D_A$ and the $D_B$ is 10 to 90 degrees.

[6] The decorative material as set forth in any one of [1] to [5], wherein an extending direction of the groove-shaped parallel recess and projection pattern in each of the closed regions is arranged at random in a first principal surface.

[7] The decorative material as set forth in any one of [1] to [6], wherein at least some of adjacent closed regions satisfies (e) as follows:

(e) When a filling amount per unit area of the coloring agent that is filled in recesses of a groove-shaped parallel recess and projection pattern in an arbitrary closed region A is defined as $W_A$, and a filling amount per unit area of the coloring agent that is filled in recesses of a groove-shaped parallel recess and projection pattern in an arbitrary closed region B adjacent to the closed region A is defined as $W_B$, $W_A \neq W_B$ is established.

[8] The decorative material as set forth in [1] to [7], wherein when a width of the recess of the groove-shaped parallel recess and projection pattern is defined as X, a width of a projection of the groove-shaped parallel recess and projection pattern is defined as Y, and a depth of the recess of the groove-shaped parallel recess and projection pattern is defined as Z, the X is 20 to 250 μm, the Y is 20 to 250 μm, and the Z is 5 to 120 μm.

[9] The decorative material as set forth in any one of [1] to [8], wherein an average area of the closed regions is 300 to 2000 $mm^2$.

[10] A production method for a decorative material comprising steps (1) and (2) as follows:

(1) A step of performing shaping onto a single layer of a base material selected from a plastic film or a complex of the plastic film and paper, or a laminate comprising the base material with an embossing plate, and obtaining a decorative material in which a plurality of independent closed regions each comprising a groove-shaped parallel recess and projection pattern are arranged on a first principal surface side, and in at least some of the closed regions, depths of recesses of groove-shaped parallel recess and projection patterns vary in the closed regions.

(2) A step of coating a surface on the first principal surface side of the decorative material obtained in the (1) with a filling ink comprising a coloring agent and a binder resin, and thereafter scraping out the filling ink.

Advantageous Effects of Invention

The decorative material of the present invention can give an excellent three-dimensional effect, have a large change in shadowed parts depending on the observation angle, and therefore is extremely excellent in design aesthetics. Furthermore, the production method of the decorative material of the present invention can easily produce the decorative material including the aforementioned effects.

DESCRIPTION OF EMBODIMENT

[Decorative Material]

In a decorative material of the present invention, on a first principal surface side, a plurality of independent closed regions each having a groove-shaped parallel recess and projection pattern are disposed, in at least some of the closed regions, depths of recesses of groove-shaped parallel recess and projection patterns vary in the closed regions, and a coloring agent is filled in at least parts in a depth direction of the recesses of the groove-shaped parallel recess and projection pattern in each of the closed regions.

<First Principal Surface of Decorative Material>

Figure 1:
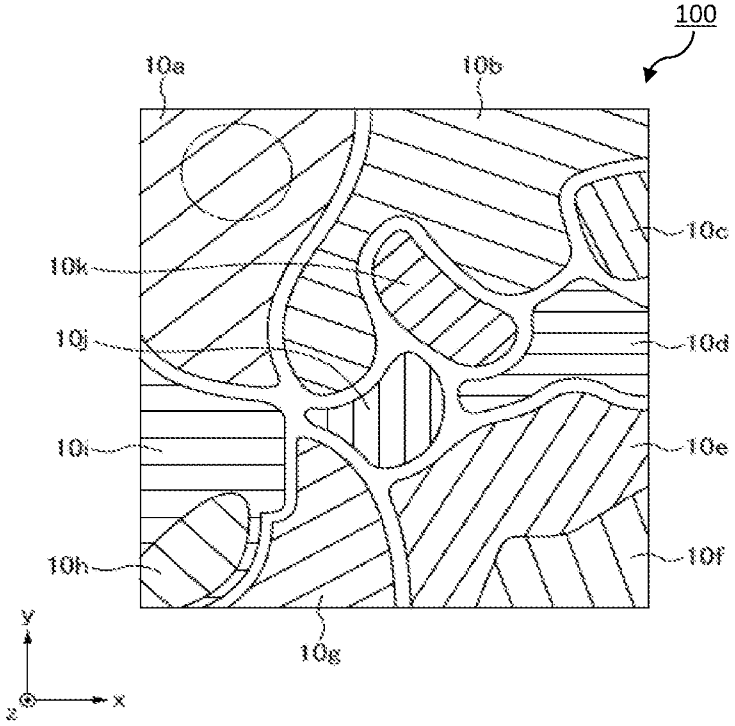
FIG. 1 is a plan view of a first principle surface side showing one embodiment of a decorative material of the present invention.

FIG. 1 is a plan view of a first principal surface side showing one embodiment of a decorative material 100 of the present invention. The decorative material 100 in FIG. 1 has a plurality of independent closed regions (11 closed regions that are 10*a* to 10*k* substantially clockwise from an upper left end) on a surface on the first principal surface side. Furthermore, the decorative material 100 in FIG. 1 has groove-shaped parallel recess and projection patterns in the respective independent closed regions.

Note that, here, the "first principal surface" is a target surface to be given a design appearance (decorated) of the decorative material 10, and refers to a surface on a side exposed to outside and provided for observation, when the decorative material 100 is used for an interior material of a building or the like. When the decorative material 100 is a plate-shaped rectangular parallelepiped (6 surfaces exists), either one of a pair of surfaces each having a largest area is normally selected as the first principal surface.

Figure 2:
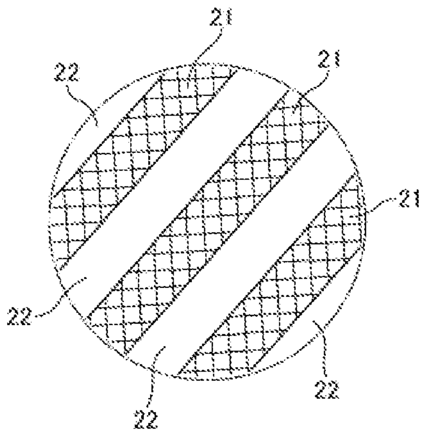
FIG. 2 is an enlarged plan view of a circular part surrounded by an alternate long and short dash line in FIG. 1.

FIG. 2 is an enlarged plan view of a circular part surrounded by an alternate long and short dash line in FIG. 1. As shown in FIG. 2, a groove-shaped parallel recess and projection pattern in a closed region is constituted of recesses 21 and projections 22.

Note that in the present description, "parallel" of the groove-shaped parallel recess and projection pattern means that recesses in each of the closed regions are parallel with one another when the decorative material is seen in plan view (in this case, the projections in each of the closed regions are also parallel with one another). Furthermore, "parallel" of the groove-shaped parallel recess and projection pattern is not limited to completely parallel, but includes substantially parallel. Substantially parallel means that when tangential lines are drawn to edges of a pair of recesses adjacent in the closed region, an angle formed by two tangential lines is within 2.0 degrees, and the angle is preferably within 0.5 degrees, and more preferably within 0.2 degrees.

Figure 3:
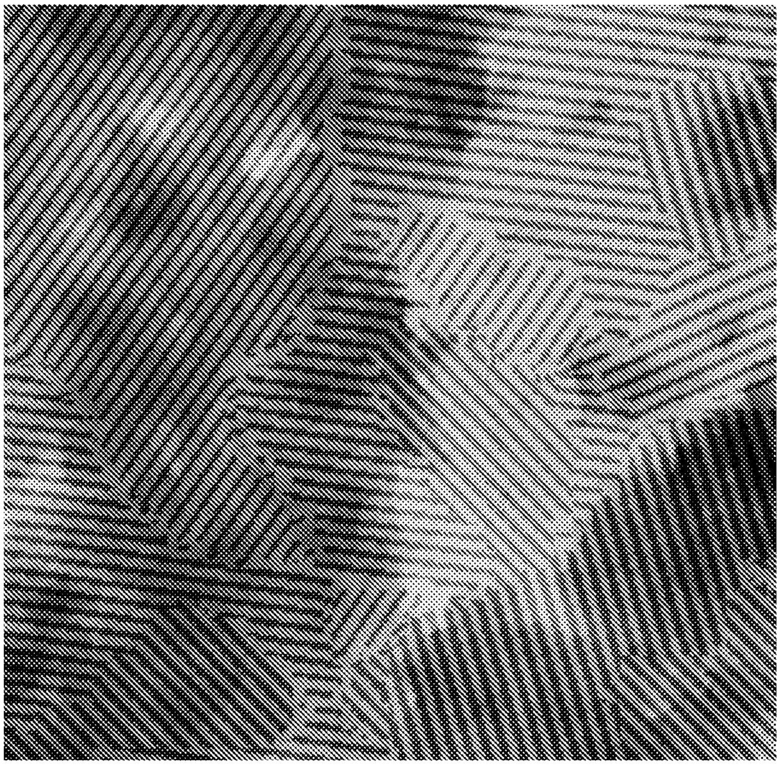
FIG. 3 is an image obtained by measuring an altitude of a decorative material in example 1 from a first principal surface side and expressing the measured altitude by density.

FIG. 3 is a plan view obtained by measuring an altitude of a decorative material in example 1 from an n side and expressing the measured altitude by density. FIG. 3 means that the lower the density, the higher the altitude, and the higher the density, the lower the altitude, and an elongated portion with high density extending in an arbitrary direction corresponds to the recess. Furthermore, in closed regions adjacent to one another in FIG. 3, extending directions of the groove-shaped parallel recess and projection patterns differ from one another.

Figure 4:
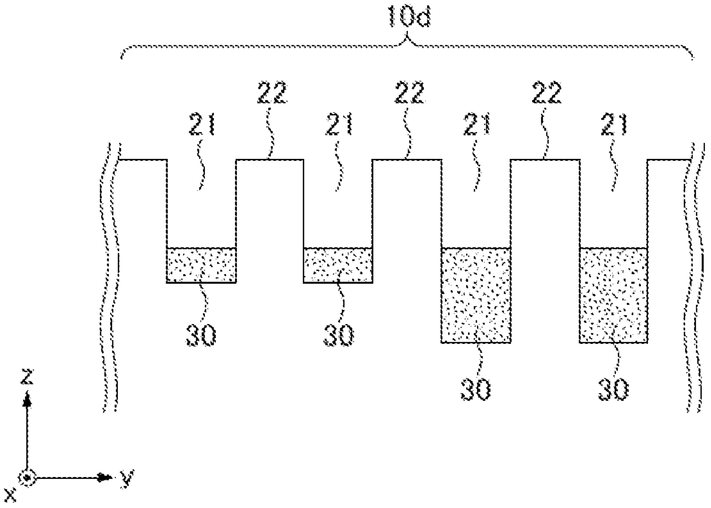
FIG. 4(A) and FIG. 4(B) are sectional views of closed regions 10*d* and 10*j* in FIG. 1.
Figure 4:
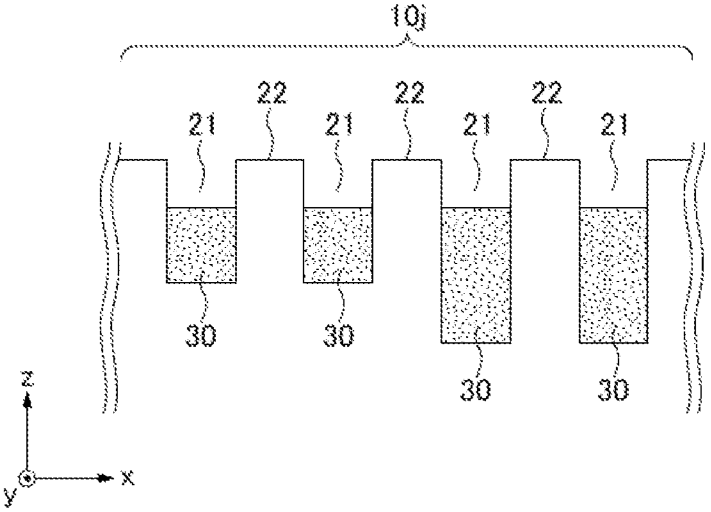

FIG. 4(A) is a sectional view cut in a direction perpendicular to an extending direction of the groove-shaped parallel recess and projection pattern in 10*d* (direction parallel with an y-direction in FIG. 1), and a direction parallel with the z-direction in FIG. 1, concerning a closed region 10*d* in FIG. 1. Further, FIG. 4(B) is a sectional view cut in a direction perpendicular to an extending direction of a groove-shaped parallel recess and projection pattern in 10*j* (direction parallel with an x-direction in FIG. 1), and a direction parallel with the z-direction in FIG. 1, concerning the closed region 10*j* in FIG. 1.

In the groove-shaped parallel recess and projection patterns in FIG. 4(A) and FIG. 4(B), depths of the recesses 21 vary in the closed regions.

Operation Effect of First Principal Surface

When observing the decorative material of the present invention from the first principal surface side, a person feels that the decorative material is excellent in three-dimensional effect, and feels a change in shadowed parts depending on the viewing direction, and gets an impression that the design aesthetics is extremely excellent. Hereinafter, a reason for the operational effect will be described.

First, concerning each of the closed regions on the first principal surface of the decorative material, the light that is incident on the projections of the groove-shaped parallel recess and projection pattern is reflected near a specular reflection direction with almost no attenuation, and therefore a large amount of light reaches human eyes. On the other hand, light that is incident on the recesses of the groove-shaped parallel recess and projection pattern is attenuated by multiple reflection, but a predetermined reflected light reaches the human eyes. Accordingly, one can feel gloss based on the reflected light concerning each of the closed regions.

In addition, concerning each of the closed regions, the degree at which the light incident on the recesses of the groove-shaped parallel recess and projection pattern is reflected in the specular reflection direction differs depending on whether the light is visually recognized from the extending direction of the grooves or from a direction orthogonal to the extending direction of the groove. A reason thereof is that the attenuation due to multiple reflection of the light incident on the recesses is reduced when the light is visually recognized from the extending direction of the grooves. Since due to the presence of the recesses (grooves), intensity of the reflected light of each of the closed regions differs depending on the observation direction in this way, a person can feel a change in the gloss (change in shadowed parts) of each of the closed regions depending on the observation direction, and can get the impression that the design aesthetics is extremely excellent. Furthermore, by devising the shape of the closed region, and/or a pattern or the like of the decorative layer, it is possible to get impression of excellent natural object feeling by change in gloss (change in shadowed parts) of the closed region depending on the aforementioned observation direction.

The above is a basic operation by the groove-shaped parallel recess and projection pattern.

In at least some of the closed regions of the decorative material of the present invention, the depths of the recesses of the groove-shaped parallel recess and projection patterns vary in the closed regions. When the depths of the recesses differ, the degrees of attenuation by multiple reflection also differ (the deeper the recess, the more likely it is that attenuation occurs). Consequently, the closed region where the depths of the recesses vary in the closed region can generate a gloss difference in the closed region. Accordingly, the decorative material of the present invention having the closed regions where the depths of the recesses of the groove-shaped parallel recess and projection patterns vary in the closed regions can also express a three-dimensional effect based on the gloss difference.

Furthermore, the decorative material of the present invention is made by a coloring agent being filled in at least parts in the depth direction of the recesses of the groove-shaped parallel recess and projection patterns. Accordingly, the aforementioned gloss difference can be made a gross difference with color, and a person can get an impression of a deep three-dimensional effect.

Furthermore, as is known from sectional views of FIG. 4(A) and FIG. 4(B), there is a tendency that the deeper a recess 21, the easier it is to increase the filling amount of a coloring agent 30 per unit area, and the shallower the recess 21, the easier it is to reduce the filling amount of the coloring agent 30 per unit area. Accordingly, in addition to the gloss difference including color described above, a density difference can be further added, and the three-dimensional effect can be further emphasized.

Furthermore, the decorative material of the present invention can also give the aforementioned effect without being provided with the decorative layer by the printing method. In other words, the decorative material of the present invention can express the design of the pattern that gives the three-dimensional effect by the specific closed regions and the coloring agent that is filled in the recesses of the closed regions, without the decorative layer from a viewpoint of a layer structure, or without going through a printing process from a viewpoint of a production step. Furthermore, the decorative material of the present invention can give the recess three-dimensional effect without the decorative layer by a printing process, and therefore can synchronize appearance of the design and tactile impression of the recess and projection shape.

As a direction in which the depths of the recesses of the groove-shaped parallel recess and projection pattern vary, the depths may vary in an extending direction of the pattern, may vary in a direction orthogonal to the extending direction of the pattern, or may vary in a combined direction of the two directions. The depths of the recesses varying in the extending direction of the pattern means that the depths vary in the extending direction of the groove-shaped recesses. Furthermore, the depths of the recesses varying in the direction orthogonal to the extending direction of the pattern means that the depths of the adjacent groove-shaped recesses vary.

In one embodiment of the decorative material, a ratio of the closed regions where the depths of the recesses of the groove-shaped parallel recess and projection patterns vary in the closed regions to all the closed regions is preferably 80% or more based on the number of closed regions, more preferably 90% or more, even more preferably 95% or more, and even more preferably 99% or more. It is possible to make the design aesthetics more favorable by making the ratio 80% or more.

When a maximum depth of the recesses in the closed regions where the depths of the recesses of the groove-shaped parallel recess and projection patterns vary in the closed regions is defined as $Z_{max}$, and a minimum depth of the recesses is defined as $Z_{min}$, $Z_{max}/Z_{min}$ is preferably 2 or more, and is more preferably 5 to 10.

In one embodiment of the decorative material, at least some of the adjacent closed regions preferably satisfy one or more selected from the group consisting of (a) to (d) below.

(a) When a width of a recess of a groove-shaped parallel recess and projection pattern in an arbitrary closed region A is defined as $X_A$, and a width of a recess of a groove-shaped parallel recess and projection pattern in an arbitrary closed region B adjacent to the closed region A is defined as $X_B$, $X_A \neq X_B$ is established.

(b) When a width of a projection of the groove-shaped parallel recess and projection pattern in the arbitrary closed region A is defined as $Y_A$, and a width of a projection of the groove-shaped parallel recess and projection pattern in the arbitrary closed region B adjacent to the closed region A is defined as $Y_B$, the $X_A$, the $Y_A$, the $X_B$, and the $Y_B$ satisfy $Y_A/X_A \neq Y_B/X_B$.

(c) When an average of depths of recesses of the groove-shaped parallel recess and projection pattern in the arbitrary closed region A is defined as $Z_A$, and an average of depths of recesses of the groove-shaped parallel recess and projection pattern in the arbitrary closed region B adjacent to the closed region A is defined as $Z_B$, $Z_A \neq Z_B$ is established.

(d) When an extending direction of the groove-shaped parallel recess and projection pattern in the arbitrary closed region A is defined as $D_A$, and an extending direction of the groove-shaped parallel recess and projection pattern in the arbitrary closed region B adjacent to the closed region A is defined as $D_B$, the $D_A$ and the $D_B$ are non-parallel with each other.

By satisfying at least any one of (a) to (d) described above, it is possible to generate a gloss difference in the adjacent closed regions. Accordingly, a person can get an impression of a more excellent three-dimensional effect by the gloss difference. Since the recesses of the groove-shaped parallel recess and projection pattern are colored, the gloss difference can be made a gloss difference including color, and a person can get an expression of a deep three-dimensional effect. Furthermore, by satisfying at least any one of (a) to (d) described above, it is possible to change tactile impression within the surface of the decorative material.

Note that on the first principal surface side, a plurality of combinations exist in the adjacent closed regions. In other words, "at least some of the adjacent closed regions satisfy one or more selected from the group consisting of (a) to (d)" means that even only one combination that satisfies at least any one of (a) to (d) can exist with respect to all combinations of the adjacent closed regions. A preferable ratio of the combinations satisfying at least any one of (a) to (d) with respect to all the combinations of the adjacent closed regions will be described later.

Hereinafter, an operation by (a) to (d) described above will be further described.

—(a)—

In (a), it is specified that $X_A \neq X_B$ is established when the width of the recess of the groove-shaped parallel recess and projection pattern in the arbitrary closed region A is defined as $X_A$, and the width of the recess of the groove-shaped parallel recess and projection pattern in the arbitrary closed region B adjacent to the closed region A is defined as $X_B$.

As described above, the reflected light of the light incident on the recesses of the groove-shaped parallel recess and projection pattern attenuates due to multiple reflection. An attenuation amount of the reflected light by multiple reflection varies according to the width of the recess (The narrower the width, the larger the attenuation ratio, and the wider the width, the smaller the attenuation ratio.). Accordingly, by satisfying (a), it is possible to generate a gloss difference in the adjacent regions.

—(b)—

In (b), it is specified that when the width of the projection of the groove-shaped recess and projection pattern in the arbitrary closed region A is defined as $Y_A$, and the width of the projection of the groove-shaped parallel recess and projection pattern in the arbitrary closed region B adjacent to the closed region A is defined as $Y_B$, the $X_A$, the $Y_A$, the $X_B$, and the $Y_B$ satisfy $Y_A/X_A \neq Y_B/X_B$.

Satisfying (b) means that the ratios of the recesses and the projections in an area of the closed regions differ between the adjacent closed regions. As described above, the gloss of each of the closed regions is a total of reflected lights of the projections and reflected lights of the recesses, and a ratio of the reflected lights of the projections is particularly large. Accordingly, by satisfying (b), it is possible to generate a gloss difference in the adjacent regions. Furthermore, since the coloring agent is filled in at least parts in the depth direction of the recesses, the color densities based on the coloring agent can be made different in the adjacent closed regions by satisfying (b), and the three-dimensional effect and mosaic feeling can be more emphasized.

—(c)—

In (c), it is specified that $Z_A \neq Z_B$ is satisfied, when the average of the depths of the recesses of the groove-shaped parallel recess and projection pattern in the arbitrary closed region A is defined as $Z_A$, and the average of the depths of the recesses of the groove-shaped parallel recess and projection pattern in the arbitrary closed region B adjacent to the closed region A is defined as $Z_B$.

As described above, the reflected light of the light incident on the recesses of the groove-shaped parallel recess and projection pattern attenuates by multiple reflection. The attenuation amount of the reflected light by multiple reflection varies depending on the depth of the recess (the deeper the recess, the larger the attenuation ratio, and the shallower the recess, the smaller the attenuation ratio.). Accordingly, by satisfying (c), the gloss difference can be generated in the adjacent regions.

Note that there is the tendency that the deeper the recess, the easier it is to increase the filling amount of the coloring agent per unit area, and the shallower the recess, the easier it is to reduce the filling amount of the coloring agent per unit area. Accordingly, by satisfying (c), it can be made easy to satisfy (e) described later.

—(d)—

In (d), it is specified that when the extending direction of the groove-shaped parallel recess and projection pattern in the arbitrary closed region A is defined as $D_A$, and the extending direction of the groove-shaped parallel recess and projection pattern in the arbitrary closed region B adjacent to the closed region A is defined as $D_B$, the $D_A$ and the $D_B$ are non-parallel with each other.

As described above, the degree at which the light incident on the recess of the groove-shaped parallel recess and projection pattern reflects in the specular reflection direction differs in the case of being recognized visually from the extending direction of the groove, and in the case of being recognized visually from the direction orthogonal to the extending direction of the groove. Accordingly, by satisfying (d), it is possible to generate a gloss difference in the adjacent regions.

Further, when the coloring agent is filled in the recesses by steps (1) and (2) described later, ease with which the coloring agent is filled in the recesses differs depending on a relationship between a scraping direction of the filling ink containing the coloring agent, and the extending direction of the groove-shaped parallel recess and projection pattern. Specifically, as the scraping direction of the filling ink and the extending direction of the groove-shaped parallel recess and projection pattern are closer to parallel, the coloring agent is more easily filled in the recesses. Accordingly, by satisfying (d), it can be made easy to satisfy (e) described later.

As above, by at least some of the adjacent closed regions satisfying at least any condition of (a) to (d), the gloss difference can be generated between the closed regions that satisfy the condition.

Note that on the first principal surface side, a plurality of combinations exist in the adjacent closed regions. A ratio of the combinations that satisfies at least any one of (a) to (d) to all combinations of the adjacent closed regions is preferably 50% or more, more preferably 70% or more, even more preferably 80% or more, even more preferably 90% or more, even more preferably 95% or more, and even more preferably 99% or more.

Note that as for the combinations of the plurality of adjacent closed regions that exist in the surface, the respective combinations may satisfy different conditions. For example, an arbitrary pair of adjacent closed regions satisfy (a) described above, and other pair of adjacent closed regions may satisfy (d) described above.

Among (a) to (d), (b) and (d) easily give the gloss difference to the adjacent closed regions, and (d) gives the gloss difference more easily than (b).

Accordingly, at least some of the adjacent closed regions preferably satisfy at least either one of (b) and (d), more preferably satisfy (d), and even more preferably satisfy (b) and (d). Furthermore, at least some of the adjacent closed regions even more preferably satisfy (b) and (d), and at least either one of (a) and (c).

In the decorative material of the present invention, at least some of the adjacent closed regions preferably further satisfy (e) described below.

(e) When a filling amount per unit area of the coloring agent that is filled in the recesses of the groove-shaped parallel recess and projection pattern in the arbitrary closed region A is defined as $W_A$, and a filling amount per unit area of the coloring agent that is filled in the recesses of the groove-shaped parallel recess and projection pattern in the arbitrary closed region B adjacent to the closed region A is defined as $W_B$, $W_A \neq W_B$ is established.

FIG. 4(A) is a sectional view cut in a direction perpendicular to the extending direction of the groove-shaped parallel recess and projection pattern in 10*d* (direction parallel with the y-direction in FIG. 1), and a direction parallel with the z-direction in FIG. 1, concerning the closed region 10*d* in FIG. 1. Furthermore, FIG. 4(B) is a sectional view that is cut in a perpendicular direction to the extending direction of the groove-shaped parallel recess and projection pattern in 10*j* (direction parallel with the x-direction in FIG. 1), and in a direction parallel with the z-direction in FIG. 1, concerning the closed region 10*j* in FIG. 1.

In both of FIG. 4(A) and FIG. 4(B), the coloring agent 30 is filled in parts in the depth direction of the recesses 21. Furthermore, a filling amount per unit area of the coloring agent 30 is larger in FIG. 4(B), and the relationship of (e) described above is satisfied. As means for making the filling amount per unit area of the coloring agent 30 a large and small relationship in FIG. 4(A) and FIG. 4(B), there is cited means for bringing a scraping direction of the filling ink closer to parallel to the extending direction of the groove-shaped parallel recess and projection pattern in the closed region 10*j* than the extending direction of the groove-shaped parallel recess and projection pattern in the closed region 10*d*.

By satisfying (e) described above, the color densities based on the coloring agent can be made different in the adjacent closed regions, and mosaic feeling and the three-dimensional effect can be more emphasized. Note that as described above, as means for satisfying (e) described above, there is cited means for coating the first principal surface of the decorative material that satisfies (c) and/or (d) described above with a filling ink including the coloring agent, and scraping out the attached filling ink.

Note that on the first principal surface side, there are a plurality of combinations in the adjacent closed regions. In other words, "at least some of the adjacent closed regions satisfy (e)" means that even only one combination that satisfies (e) can exist with respect to all the combinations of the adjacent closed regions. A preferable ratio of combinations that satisfy (e) to all the combinations of the adjacent closed regions is preferably 50% or more, more preferably 70% or more, even more preferably 80% or more, even more preferably 90% or more, even more preferably 95% or more, and even more preferably 99% or more, on a number basis.

<<Calculation of Width, Depth, and Extending Direction>>

Concerning the groove-shaped parallel recess and projection pattern of each of the closed regions, it is possible to calculate a width X of the recess, a width Y of the projection, a depth Z of the recess, and an extending direction D of the pattern based on an image obtained by measuring an altitude of the decorative material from the first principal surface side, and displaying the measured altitude by dividing the measured altitude into 256 gradations (for example, FIG. 3), and a measurement value of the altitude, for example. When there are slight variations in the widths X of the recesses, the widths Y of the projections, the depths Z of the recesses, and the extending direction D of the pattern in each of the closed regions, average values of them can be determined as the width X of the recess, the width Y of the projection, the depth Z of the recess, and the extending direction D of the pattern in each of the closed regions. Note that the projections in each of the closed regions mean those located between the recesses.

FIG. 3 means that the thinner the density, the higher the altitude, and the thicker the density, the lower the altitude, and elongated portions with high density extending in arbitrary directions correspond to the recesses, portions between the recesses correspond to the projections.

Note that FIG. 3 is what is formed by using an embossing plate that is engraved by laser, and therefore has microscopic level differences corresponding to the shape cut by one laser beam at edges of the recesses. The width X of the recess, the width Y of the projection, and the extending direction D of the pattern can be calculated by smoothing the microscopic level differences like them.

Preferable Embodiment of Width and Depth

When the width of the recess of the groove-shaped parallel recess and projection pattern is defined as X, the width of the projection of the groove-shaped parallel recess and projection pattern is defined as Y, and the depth of the recess of the groove-shaped parallel recess and projection pattern is defined as Z, in the decorative material of the present invention, X is preferably 20 to 250 μm, Y is preferably 20 to 250 μm, and Z is preferably 5 to 120 μm.

By making the width X of the recess 20 μm or more, it is possible to cause the reflected light from the recess to be visually recognized by a person, and by extension, it is possible to cause a change in gloss in each of the closed regions to be easily felt depending on the observation direction. By making the width X of the recess 20 μm or more, it is possible to easily give tactile impression. By making the width X of the recess 250 μm or less, it is possible to suppress the gloss difference between the case of being visually recognized from the extending direction of the groove, and the case of being visually recognized from the direction orthogonal to the extending direction of the groove, from becoming hard to feel.

The width X of the recess is more preferably 40 to 230 μm, even more preferably 50 to 200 μm, and even more preferably 60 to 190 μm.

Note that (a) described above specifies that $X_A \neq X_B$ is established, but a difference between $X_A$ and $X_B$ is preferably within a predetermined range. Specifically, an absolute value of the difference between $X_A$ and $X_B$ is preferably 50 to 150 μm, and more preferably 80 to 120 μm. By making the absolute value 50 μm or more, it is possible to cause the gloss difference in the adjacent closed regions to be easily felt. Furthermore, by making the absolute value 150 μm or less, it is possible to suppress feeling of strangeness or feeling of foreign matters due to the gloss difference in the adjacent closed regions being too large.

By making the width Y of the projection 20 μm or more, it is possible to cause a person to visually recognize specular reflection light from the projection, and it is possible to ensure predetermined gloss easily. Furthermore, by making the width Y of the projection 250 μm or less, it is possible to suppress reflection of the projection from being too strong, and it is possible to cause anisotropy of the gloss based on reflection from the recess to be easily recognized.

The width Y of the projection is preferably 40 to 230 μm, more preferably 50 to 200 μm, and even more preferably 60 to 190 μm.

Furthermore, Y/X is preferably 0.5 to 4.0, and more preferably 0.7 to 3.0.

Note that (b) described above specifies that $Y_A/X_A \neq Y_B/X_B$ is satisfied, but a difference between $Y_A/X_A$ and $Y_B/X_B$ is preferably within a predetermined range. Specifically, an absolute value of the difference between $Y_A/X_A$ and $Y_B/X_B$ is preferably 0.5 to 3.0, and more preferably 0.8 to 2.5. By making the absolute value 0.5 or more, it is possible to cause the gloss difference in the adjacent closed regions to be easily felt. Furthermore, by making the absolute value 0.5 or more, it is possible to easily increase a difference in color density based on the coloring agent of the adjacent closed regions, and it is possible to emphasize mosaic feeling and a three-dimensional effect more. Furthermore, by making the absolute value 3.0 or less, it is possible to suppress feeling of strangeness or feeling of foreign matters due to the gloss difference in the adjacent closed regions being too large.

By making the depth Z of the recess 5 μm or more, it is possible to cause the change in gloss in each of the closed regions to be easily felt depending on the observation direction. Furthermore, by making the depth Z of the recess 5 μm or more, it is possible to easily give tactile impression. By making the depth Z 120 μm or less, it is possible to suppress reflected light from the recess from being excessively attenuated even when it is observed from any direction, and it is possible to maintain a difference in gloss in each of the closed regions due to difference in observation direction.

The depth Z of the recess is more preferably 7 to 100 μm, even more preferably 8 to 90 μm, and even more preferably 10 to 80 μm.

Note that (c) described above specifies that $Z_A \neq Z_B$ is established, but a difference between $Z_A$ and $Z_B$ is preferably within a predetermined range. Specifically, an absolute value of the difference between $Z_A$ and $Z_B$ is preferably 5 to 50 μm, and more preferably 10 to 40 μm. By making the absolute value 5 μm or more, it is possible to cause the gloss difference in the adjacent closed regions to be easily felt. Furthermore, by making the absolute value 50 μm or less, it is possible to suppress feeling of strangeness or feeling of foreign matters due to the gloss difference in the adjacent closed regions being too large.

Preferable Embodiment of Extending Direction

In the decorative material of the present invention, the extending direction of the groove-shaped parallel recess and projection pattern in each of the closed regions is preferably disposed at random in the first principal surface. By adopting the configuration, when the decorative material is observed from the first principal surface side, it is possible to easily give an impression of a natural object when the decorative material is observed from the first principal surface side.

Note that the extending direction being at random includes that extending directions selected from a specific angle group are at random. When the extending directions selected from the specific angle group are at random, 0 degrees to 180 degrees are preferably divided into 6 or more at equal intervals, and more preferably divided into 8 or more, and even more preferably divided into 10 or more. For example, there is cited means for dividing 0 degrees to 180 degrees into 6 at intervals of 30 degrees, and selecting the extending direction of the groove-shaped parallel recess and projection pattern in each of the individual closed regions from six angle groups of 30 degrees, 60 degrees, 90 degrees, 120 degrees, 150 degrees and 180 degrees.

Note that (d) described above specifies that $D_A$ and $D_B$ are non-parallel, and an angle formed by $D_A$ and $D_B$ is preferably 10 to 90 degrees, more preferably 12 to 85 degrees, even more preferably 13 to 80 degrees, and even more preferably 14 to 78 degrees.

By making the angle formed by $D_A$ and $D_B$ 10 degrees or more, it is possible to easily increase the gloss difference in the adjacent regions.

The extending direction of the groove-shaped parallel recess and projection pattern in the closed region may include a curve such as an arc and a sine curve, but is preferably a straight line as shown in FIG. 1 and the like. By making the extending direction of the groove-shaped parallel recess and projection pattern a straight line, it is possible to make the effect in the case of satisfying (d) described above more remarkable.

<<Shape and Area of Closed Region>>

A shape in planar view of the individual closed region is not particularly limited, polygons such as a triangle and a quadrangle, a circle, an ellipse, and amorphous are cited, and the shape in planar view may be a single form thereof, or may be a combination thereof. When feeling of a natural object is given to the decorative material, various shapes are preferably combined at random.

According to the shapes of the closed regions, natural objects such as stone crystals, and metal crystals, a geometric pattern and the like can be expressed, for example.

An average area of a plurality of independent closed regions is preferably 300 to 2000 mm$^2$, more preferably 400 to 1500 mm$^2$, and even more preferably 500 to 1000 mm$^2$.

A ratio of an area (a total area of the independent closed regions) occupied by the independent closed areas having the groove-shaped parallel recess and projection patterns to a total area of the first principal surface is preferably 70% or more, more preferably 80% or more, even more preferably 90% or more, and even more preferably 95% or more.

<<Coloring Agent>>

The decorative material of the present invention requires that a coloring agent is filled in at least parts in the depth direction of the recesses of the groove-shaped parallel recess and projection pattern in each of the closed regions. As described above, by the recesses of the groove-shaped parallel recess and projection pattern including the coloring agent, it is possible to make the gloss difference in the surface of the decorative material a gloss difference including color, and a person can get an impression of a deep three-dimensional effect.

A color of the coloring agent is not particularly limited, use of a coloring agent of a dark color is preferable in terms of being able to increase the gloss difference in each of the closed regions. The dark color refers to colors with low brightness and low coloration that feel dark, such as dark gray, dark green, navy blue, black, dark purple, dark red, and brown.

As means for filling the coloring agent in at least parts in the depth direction of the recesses, means of coating the first principal surface side of the decorative material with a filling ink including a coloring agent and a binder resin, and scraping out the ink with a scraping blade such as a doctor blade. At this time, it is possible to adjust the amount of the coloring agent that is filled in the recess by adjusting a material of the blade, an angle to hit the blade, viscosity of the ink and the like.

As the coloring agent, there is cited an inorganic pigment such as carbon black (Japanese ink), iron black, titanium white, antimony white, chrome yellow, titanium yellow, red iron oxide, cadmium red, ultramarine, or cobalt blue, an organic pigment such as quinacridone red, isoindolenon-yellow, or phthalocyanine blue, dye or the like, for example.

As the binder resin of the filling ink, there are cited acrylic resin, styrene resin, polyester resin, urethan resin, chlorinated polyolefin resin, vinyl chloride-vinyl acetate copolymer, polyvinyl butyral, alkyd resin, petroleum resin, ketone resin, epoxy resin, melamine resin, fluororesin, silicone resin, rubber resin and the like.

<Second Principal Surface>

A shape of a surface (second principal surface) at an opposite side to the first principal surface of the decorative material is not particularly limited, and may be smooth, or may be given recesses and projections.

<Laminated Structure of Decorative Material>

For the decorative material of the present invention, laminated structures of (1) to (8) described below are cited. Note that "/" shows an interface of layers, and a surface of a layer located at a left side shows the first principal surface of the decorative material.

(1) Single layer of base material
(2) Decorative layer/base material
(3) Surface protective layer/decorative layer/base material
(4) Transparent resin layer/decorative layer/base material
(5) Surface protective layer/transparent resin layer/decorative layer/base material
(6) Surface protective layer/primer layer/transparent resin layer/decorative layer/base material
(7) Surface protective layer/base material/decorative layer
(8) Surface protective layer/primer layer/base material/decorative layer <<Base Material>>

The decorative material preferably includes the base material. A material of the base material is not particularly limited, but considering the ease of forming the first principal surface described above by embossing, a plastic film or a complex of a plastic film and paper is preferable.

As a specific example of a resin constituting the plastic film, a polyolefin resin such as polyethylene and polypropylene, a vinyl resin such as vinyl chloride resin, vinylidene chloride resin, polyvinyl alcohol, and ethylene-vinyl alcohol copolymer, polyester resin such as polyethylene terephthalate, and polybutylene terephthalate, acrylic resin such as polymethyl methacrylate, polymethyl acrylate, and polyethyl methacrylate, polystyrene, acrylonitrile-butadiene-styrene copolymer (ABS resin), cellulose triacetate, polycarbonate and the like are cited. Among these, a polyolefin resin, vinyl chloride resin, polyester resin or acrylic resin is preferable, from viewpoints of various physical properties such as weather resistance and water resistance, printability, forming process suitability, price and the like.

The base material may be a transparent base material, or may be a colored base material. Furthermore, the base material may be a laminated base material with a plurality of base materials laminated. Note that when the laminated structure of the decorative material is (7) and (8) described above, a transparent base material is used for the base material to visually recognize the decorative layer through the base material.

A thickness of the base material is not particularly limited, but is preferably 20 to 200 μm, more preferably 40 to 160 μm, and even more preferably 40 to 100 μm.

On the base material, in order to improve adhesion with a layer provided on the base material, easy adhesion treatment such as physical treatment or chemical surface treatment may be performed on one side or both sides.

<<Decorative Layer>>

From a viewpoint of improving design aesthetics, the decorative sheet preferably has a decorative layer on an arbitrary spot of the decorative sheet. Note that as described above, the decorative sheet can express patterns without the decorative layer.

The spot where the decorative layer is formed is preferably on a side close to the base material from a viewpoint of enhancing the weather resistance of the decorative layer. Note that when the base material is transparent, the decorative layer may be located on an inner layer side (opposite side to the first principal surface) from the base material, as the above described laminate structures (7) and (8).

The decorative layer may be, for example, a colored layer (a so-called solid colored layer) covering an entire surface, or a pattern layer formed by printing various patterns by using an ink and a printer, or a combination of these.

As described above, the decorative sheet can express patterns without the decorative layer, and therefore, preferably, the decorative layer is only the solid colored layer for color adjustment.

For example, the decorative layer can be formed by applying a decorative layer ink including a coloring agent such as a pigment and a dye, and a binder resin, and drying the applied ink. Additive such as an extender pigment, an anti-oxidant, a plasticizer, a catalyst, a curing agent, an ultraviolet absorber, and a light stabilizer can be mixed with the ink as necessary.

The coloring agent and the binder resin of the decorative layer are not particularly limited, and same things as those illustrated in the filling ink can be used, for example.

A thickness of the decorative layer can be properly selected according to a desired pattern, but from viewpoints of concealing a ground color of an adherend, and improving the design aesthetics, the thickness of the decorative layer is preferably 0.1 μm or more and 20 μm or less, more preferably 0.5 μm or more and 10 μm or less, and even more preferably 1.0 μm or more and 5.0 μm or less.

<<Surface Protective Layer>>

The decorative material may have a surface protective layer to enhance scratch resistance.

The surface protective layer preferably includes a cured product of a curable resin composition, from a viewpoint of improving scratch resistance of the decorative sheet.

As the curable resin composition, there are cited thermosetting resin compositions including a thermosetting resin, ionizing radiation curable resin compositions including an ionizing radiation curable resin, and a mixture thereof. Among them, ionizing radiation curable resin compositions are preferable, from a viewpoint of enhancing crosslink density of the surface protective layer and improving surface characteristics such as scratch resistance. Furthermore, an electron ray curable resin composition is more preferable among the ionizing radiation curable resin compositions from a viewpoint of being able to be coated with no solvent, and easy to handle.

The thermosetting resin composition is a composition including at least a thermosetting resin, and is a resin composition that cures by heating. As the thermosetting resin, there are cited acrylic resin, urethan resin, phenol resin, urea melamine resin, epoxy resin, unsaturated polyester resin, silicon resin and the like. For the thermosetting resin compositions, a curing agent is added to these curable resins as necessary.

An ionizing radiation curable resin composition is a composition including a compound having an ionizing radiation curable functional group (hereinafter, also referred to as an "ionizing radiation curable compound"). The ionizing radiation curable functional groups are groups that crosslink and cure by irradiation of ionizing radiation, and preferable examples include functional groups having an ethylenic double bond, such as a (meth)acryloyl group, a vinyl group, and an allyl group. Note that in the present description, the (meth)acryloyl group refers to an acryloyl group or a methacryloyl group. Furthermore, in the present description, (meth)acrylate refers to acrylate or methacrylate.

Further, ionizing radiation means electromagnetic waves or charged particle beams having energy quantum that can polymerize or crosslink molecules, ultraviolet rays (UV) or electron beams (EB) are normally used, but in addition to them, ionizing radiation also includes electromagnetic waves such as X-rays and y rays, and charged particle beams such as a rays and ion rays.

Specifically, the ionizing radiation curable compound can be properly selected from polymerizable monomers, and polymerizable oligomers that have been conventionally used as the ionizing radiation curable resins to be used.

As the polymerizable monomers, (meth)acrylate monomers having radical polymerizable unsaturated groups in molecules are preferable, and among them, polyfunctional (meth) acrylate monomer is preferable. Here, "(meth)acrylate" means "acrylate or methacrylate".

As the polyfunctional (meth)acrylate monomer, there is cited a (meth)acrylate monomer having two or more ionizing radiation curable functional groups in the molecule, and having at least a (meth)acryloyl group as the functional groups.

As the polymerizable oligomer, there is cited a (meth) acrylate oligomer having two or more ionizing radiation curable functional groups in the molecule, and having at least a (meth)acryloyl group as the functional groups, for example. For example, there are cited a urethan (meth) acrylate oligomer, epoxy (meth)acrylate oligomer, polyester (meth)acrylate oligomer, polyether (meth)acrylate oligomer, polycarbonate (meth)acrylate oligomer, acrylic (meth)acrylate oligomer and the like.

Furthermore, as the polymerizing oligomer, in addition to the above, there are a highly hydrophobic polybutadiene (meth)acrylate oligomer having a (meth)acrylate group in side chains of polybutadiene oligomer, a silicone (meth) acrylate oligomer having polysiloxane bond in a main chain, aminoplast resin (meth)acrylate-based oligomer in which an aminoplast resin having many reactive groups in the small molecule is modified, or an oligomer having a cationic polymerizable functional group in the molecules of a novolac type epoxy resin, bisphenol type epoxy resin, aliphatic vinyl ether, aromatic vinyl ether or the like, and the like.

These polymerizable oligomers may be used alone, or in combination of a plurality of types of them. From a viewpoint of improving processing characteristics and scratch resistance and weather resistance, one or more selected from the group consisting of urethane (meth)acrylate oligomer, epoxy (meth)acrylate oligomer, polyester (meth)acrylate oligomer, polyether (meth)acrylate oligomer, polycarbonate (meth)acrylate oligomer, and an acrylic (meth)acrylate oligomer is preferable, one or more selected from the group consisting of a urethane (meth)acrylate oligomer and polycarbonate (meth)acrylate oligomer is more preferable, and a urethane (meth)acrylate oligomer is even more preferable.

In the ionizing radiation curable resin composition, monofunctional (meth)acrylates can be used in combination, for the purpose of reducing viscosity of the ionizing radiation curable resin composition and the like. These monofunctional (meth)acrylates may be used alone or in combination of a plurality of types thereof.

When the ionizing radiation curable compound is an ultraviolet curable compound, the ionizing radiation curable resin composition preferably contains an additive such as a photopolymerization initiator and photopolymerization accelerator.

As the photopolymerization initiator, one or more selected from the group consisting of acetophenone, benzophenone, α-hydroxyalkylphenone, Michler's ketone, benzoin, benzyl dimethyl ketal, benzoyl benzoate, α-acyl oxime ester, thioxanthones and the like are cited.

Furthermore, the photopolymerization accelerator can reduce polymerization inhibition by air during curing and increase a curing speed, and one or more selected from the group consisting of, for example, p-dimethylaminobenzoic acid isoamyl ester, p-dimethylaminobenzoic acid ethyl ester and the like is cited.

The surface protective layer may contain additives such as an ultraviolet absorber, a light stabilizer, and a coloring agent as necessary.

A thickness of the surface protective layer is preferably 1.5 μm or more and m or less, more preferably 2 μm or more and 15 μm or less, and even more preferably 3 μm or more and 10 μm or less, from a viewpoint of balance of the processing characteristics, scratch resistance and weather resistance.

<<Transparent Resin Layer>>

The decorative sheet may have a transparent resin layer from a viewpoint of enhancing strength. When the decorative sheet has the surface protective layer, the transparent resin layer is preferably located between the base material and the surface protective layer. When the decorative sheet has a primer layer, the transparent resin layer is preferably located between the base material and the primer layer. Furthermore, when the decorative sheet has a decorative layer, from a viewpoint of protection of the decorative layer, the transparent resin layer is preferably located between the decorative layer and the surface protective layer.

As a resin constituting the transparent resin layer, there are cited a polyolefin-based resin, polyester resin, polycarbonate resin, aclylonitrile-butadiene-styrene copolymer (ABS resin), acrylic resin, vinyl chloride resin and the like, and among these, a polyolefin-based resin is preferable from a viewpoint of processing suitability. Further, the transparent resin layer may be formed by mixing these illustrated resins, or may be formed by laminating layers comprising one or two or more kinds of the illustrated resins.

As the polyolefin-based resin of the transparent resin layer, there are cited polyethylene (low density, middle density, and high density), polypropylene, polymethylpentene, polybutene, ethylene-propylene copolymer, propylene-butene copolymer, ethylene-vinyl acetate copolymer, ethylene-acrylic acid copolymer, ethylene-propylene-butene copolymer and the like. Among these, polyethylene (low density, middle density and high density), polypropylene, ethylene-propylene copolymer, and propylene-butene copolymer are preferable, and polypropylene is more preferable.

The transparent resin layer may contain additives such as an ultraviolet absorber, a light stabilizer, and a coloring agent. When the transparent resin layer contains an ultraviolet absorber, the ultraviolet absorber is preferably a triazine compound, and is more preferably hydroxyphenyl triazine compound.

A thickness of the transparent resin layer is preferably 20 μm or more and 150 μm or less, more preferably 40 μm or more and 120 μm or less, and even more preferably 60 μm or more and 100 μm or less, from the viewpoint of balance of scratch resistance, processing suitability and weather resistance.

<<Primer Layer>>

When the decorative sheet has the surface protective layer, the decorative sheet preferably has a primer layer in contact with a surface on a base material side, of the surface protective layer. By the primer layer, adhesion of the base material and the surface protective layer (adhesion of the transparent resin layer and the surface protective layer when having the transparent resin layer) is improved, and securement of long-term interlayer adhesion (so-called weather resistant adhesion) when exposed to outdoor and scratch resistance can be easily made favorable.

The primer layer is mainly composed of a binder resin, and may contain additives such as an ultraviolet absorber, and a light stabilizer as necessary.

As the binder resin of the primer layer, resins such as urethane resin, acrylic polyol resin, acrylic resin, ester resin, amide resin, butyral resin, styrene resin, urethane-acrylic copolymer, polycarbonate urethane-acrylic copolymer (urethane-acrylic copolymer derived from a polymer (polycarbonate polyol) having a carbonate bond in a polymer main chain, and having two or more hydroxy groups at the ends and side chains), vinyl chloride-vinyl acetate copolymer resin, vinyl chloride-vinyl acetate-acrylic copolymer resin, chlorinated propylene resin, nitrocellulose resin (nitrified cotton), and cellulose acetate resin are preferably cited, and these resins can be used alone, or in combination of a plurality of kinds thereof. Furthermore, the binder resin may be binder resins formed by adding a curing agent such as an isocyanate-based curing agent and an epoxy curing agent to these resins, and crosslinking and curing the resins.

Among them, the binder resin made by crosslinking and curing the polyol resin such as an acrylic polyol resin by the isocyanate-based curing agent is preferable, and the binder resin formed by crosslinking and curing the acrylic polyol resin by the isocyanate-based curing agent is more preferable.

A thickness of the primer layer is preferably 0.5 μm or more and 10 μm or less, more preferably 0.7 μm or more and 8 μm or less, and even more preferably 1 μm or more and 6 μm or less.

<<Other Layers>>

The decorative material of the present invention may have other layers such as an adhesive layer and a backside primer layer.

When the decorative sheet has a transparent resin layer, an adhesive layer is preferably formed between the base material and the transparent resin layer to improve adhesion of both the layers.

Note that when a decorative layer is further included between the base material and the transparent resin layer, a positional relation of the adhesive layer and the decorative layer is not particularly limited. Specifically, the decorative sheet may have the decorative layer, the adhesive layer and the transparent resin layer in this order from a side close to the base material, or may have the adhesive layer, the decorative layer and the transparent resin layer in this order from the side close to the base material.

The adhesive layer can be composed of, for example, a general-purpose adhesive such as a urethane adhesive, acrylic adhesive, epoxy adhesive, and rubber adhesive. Among these adhesives, a urethane adhesive is preferable in terms of adhesive strength.

As the urethane adhesive, there is cited an adhesive using a two-component curable urethane resin including a polyol compound such as polyether polyol, polyester polyol, and acrylic polyol, and a curing agent such as an isocyanate compound, for example.

A thickness of the adhesive layer is preferably 0.1 μm or more and 30 μm or less, more preferably 1 μm or more and 15 μm or less, and even more preferably 2 m or more and 10 μm or less.

The backside primer layer is a layer formed on a surface on an opposite side to the first principal surface of the decorative material for the purpose of improving adhesion of the decorative material and various adherends.

The material for use in formation of the backside primer layer is not particularly limited, there are cited urethane resin, acrylic resin, polyester resin, vinyl chloride/vinyl acetate copolymer, chlorinated polypropylene resin, chlorinated polyethylene resin and the like, and the material is properly selected according to the material of the adherend.

A thickness of the backside primer layer is preferably 0.5 to 5.0 μm, and more preferably 1 to 3 μm.

The decorative layer, the surface protective layer, the primer layer, the adhesive layer and the backside primer layer described above can be formed by applying an ink containing compositions forming the respective layers by a known method such as a gravure printing method, barcode method, roll coat method, reverse roll coat method, and comma coat method, and drying and curing the ink as necessary.

Furthermore, the transparent resin layer can be formed by heat melt extrusion, for example.

<Use of Decorative Material>

The decorative material of the present invention can be used for various purposes as it is, or as a laminate in which it is bonded to an adherend, or by applying predetermined forming processing or the like to the decorative material or the laminate.

As the various use purposes, there are cited interior materials of buildings such as walls, ceilings, and floors; fittings such as window frames, doors and handrails; furniture; casings of home appliances, OA equipment and the like; exterior materials such as entrance doors and the like.

As the adherend, there are cited, for example, a wood board such as a wood veneer, wood plywood, particle board, MDF (medium density fiber board), and laminated lumber; a gypsum board such as a gypsum board, and gypsum slag board; a cement board such as a calcium silicate board, asbestos slate board, lightweight foam concrete board, and hollow extruded cement board; a fiber cement board such as a pulp cement board, asbestos cement board, and wood piece cement board; ceramic plate such as pottery, porcelain, earthenware, glass and enamel ware; a metal plate such as an iron plate, galvanized steel sheet, polyvinyl chloride sol-coated steel sheet, aluminum plate, and copper plate; a thermoplastic resin plate such as a polyolefin resin plate, acrylic resin plate, ABS resin plate, and polycarbonate plate; a thermosetting resin plate such as a phenol resin plate, urea resin plate, unsaturated polyester resin plate, polyurethan resin plate, epoxy resin plate, and melamine resin plate; a so-called FRP plate obtained by impregnating a glass fiber nonwoven fabric, textile, paper, and other various fiber base materials with a resin such as a phenol resin, urea resin, unsaturated polyester resin, polyurethane resin, epoxy resin, melamine resin, and diallyl phthalate resin, and curing them to combine them, and the like, and these may be used alone, or may be used as a composite substrate with two layers or more of them laminated.

<Forming Method of First Principal Surface>

The recess and projection shape on the first principal surface of the decorative material can be formed by shaping with an embossing plate engraved with laser light, for example.

Figure 5:
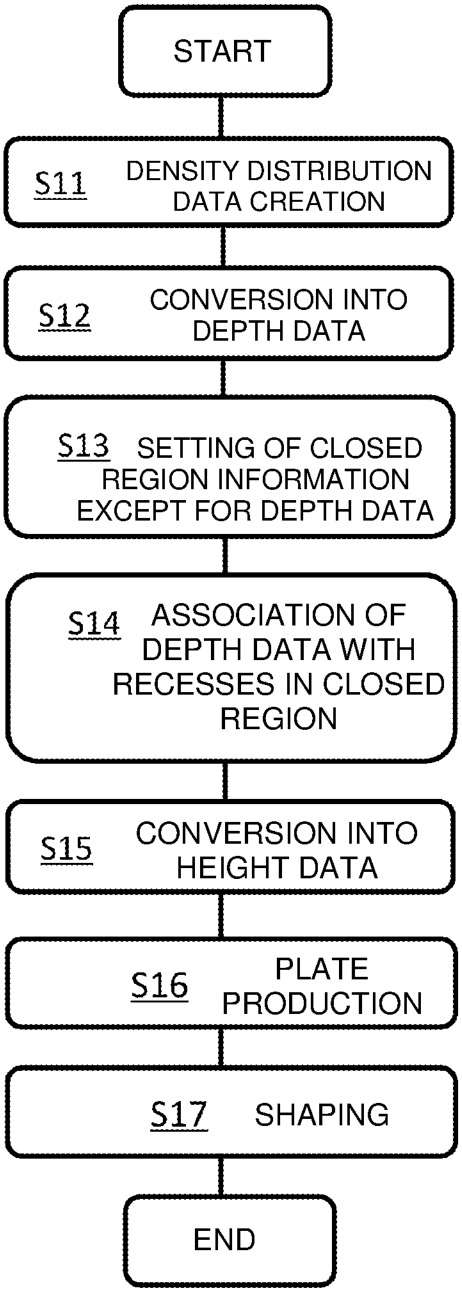
FIG. 5 is a chart showing a flow of one embodiment of a process of forming a recess and projection shape of a first principle surface of a decorative material of the present invention.

The shaping by the embossing plate engraved with laser light can be carried out in steps (S11 to S17) in FIG. 5, for example. Hereinafter, the respective steps will be described.

<<S11: Density Distribution Data Creation>>

Figure 6:
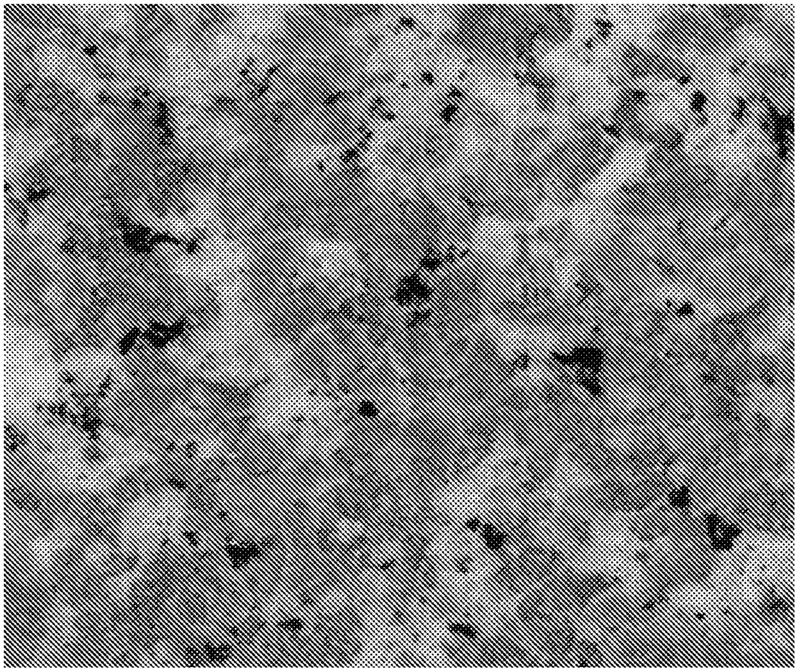
FIG. 6 is one example of an image for use in creation of density distribution data in step S11 in FIG. 5.

In step S11, a density distribution image that is a source of depth data of the groove-shaped parallel recess and projection pattern in each of the closed regions on the decorative material 100 is acquired, and this is determined as density distribution data. As an example of the density distribution image, an image in which only a stone crystal pattern is expressed is cited. Further, one example of the density distribution image is shown in FIG. 6.

The density distribution image acquired in step S11 is preferably a two-dimensional density pattern having no height information. As the density pattern like this, a photograph, a picture, a printed matter and the like are cited. Further, a three-dimensional image having height information may be used, but at this time, the height information is removed, and only information by the density in two dimensions in planar view is preferably used.

In step S11, a density value D (x, y) is obtained at each two-dimensional coordinates (x, y) to be made the density distribution data, with respect to the obtained density distribution image.

The two-dimensional coordinates (x, y) are not particularly limited, but are preferably caused to correspond to coordinates of plate (metal roll-shaped embossing plate in the present embodiment) surface described later. Further, specific expression of the density value D is not particularly limited, but the density value can be expressed in 256 gradations by setting a darkest portion of the density distribution image as 255, and a lightest portion as 0, and evenly allocating a part between them with integers, for example.

By the above, a set of data of the density value D expressed by 256 gradations in the respective coordinates (x, Y) is obtained, and this is determined as the density distribution data.

As above, the density distribution data is preferably digital data. Accordingly, when the source density distribution image is not digital data, the density distribution image is converted into digital data by using a method of reading a two-dimensional image such as a script itself, a picture of the script or the like with a scanner and AD-converting it. Further, when the pattern is designed by using digital data by using CAD or the like from the beginning, the digital data can be used.

Though means for creating the density distribution data is not particularly limited, density distribution data with a resolution of 2540 dpi with 8 bit density gradation (256 gradations) in TIF format can be created by using graphic design drawing software "photoshop" made by Adobe Systems Co., Ltd.

<<S12: Conversion of Density Distribution Data into Depth Data>>

In a conversion step into depth data (step S12), depth data is obtained by converting the density value D (x, y) of the density distribution data of the recess (A) obtained in step S11 into a depth F (x, y) at each of the coordinates (x, y). The depth data is depth data corresponding to the recesses of the groove-shaped parallel recess and projection pattern in the closed region.

Here, conversion of the density value D (x, y) into the depth F (x, y) is performed based on a predetermined rule. Thereby, the density distribution and the depth distribution are associated with each other, and a unique texture based on the density distribution image can be obtained in the surface pattern of the decorative material.

For example, in step S11, the darkest portion in the density distribution image is set as gradation 255, and in step S12, this is made a depth of 300 μm. On the other hand, in step S11, the lightest portion in the density distribution image is set to gradation 0, and in step S12, this is made a reference (depth of 0 m). With respect to gradations 0 to 255 in step S11, 0 μm to 300 μm are proportionately distributed and allocated to the depth in step S12.

Consequently, according to this example, the lightest portion in the density distribution image is the reference (depth of 0 m), the darker, the deeper, and the depth is 300 μm in the darkest portion.

<<S13: Setting of Closed Region Information Other than Depth Data>>

In step S13, closed region information other than the depth data is set. The closed region information other than the depth data refers to information concerning an allocation method of closed regions such as shapes and sizes of the respective closed regions, and widths of the recesses of the groove-shaped parallel recess and projection patterns in the respective closed regions, widths of projections, extending directions of the groove-shaped parallel recess and projection patterns and the like.

The widths of the recesses of the groove-shaped parallel recess and projection patterns in the respective closed regions, the widths of the projections and the extending directions of the groove-shaped parallel recess and projection patterns can be determined by setting predetermined numbers of choices respectively and selecting the widths and the extending directions at random from the choices, for example.

<<S14: Association of Depth Data with Recesses of Closed Region>>

Step S14 is a step of associating the depth data created in step S12 with recesses of the groove-shaped parallel recess and projection patterns in the respective closed regions set in step S13.

By step S14, data having a plurality of independent closed regions, with the recesses of the groove-shaped parallel recess and projection patterns in the respective closed regions including depth information can be obtained.

<<S15: Conversion of Depth Data into Height Data>>

In a conversion step (step S15) into height data of the embossing plate, depth data is obtained by converting the depth F (x, y) of the recesses of the groove-shaped parallel recess and projection patterns in the closed regions on the decorative material 100 obtained in step S14 into a height H (x, y) for producing an embossing plate (hereinafter, may be simply referred to as a "plate") corresponding to this. In other words, the height data H (x, y) of the embossing plate for forming the recess and projection pattern to be a complementary shape of the decorative material recesses including the depth F (x, y) on the surface of the plate is created.

By forming the recesses and projections on a surface of the plate according to the height data H (x, y), the recesses and projections on the surface of the decorative material shaped by the plate conform to the height data of the first principal surface.

In the present embodiment, when the depth F (x, y) of the decorative material is converted to the height H (x, y) of the embossing plate, it is converted to an opposite on a same scale. In other words, when "depth" is expressed as negative, and "height" is expressed as positive, F (x, y)=−H (x, y). However, conversion is not limited to this, and the depth F (x, y) may be converted to the height H (x, y) by multiplying a predetermined coefficient α in accordance with necessity of expression. For example, conversion may be performed with F (x, y)=αH (x, y). Here, a may be either positive or negative.

According to this, a plurality of kinds of decorative materials that give different impressions can be produced from the same height data by only changing a.

<<S16: Plate Making>>

In a plate making step (S16), a plate having recesses and projections on a surface is produced by using the height data by the height H (x, y) obtained in step S15. Here, as one example, an embossing plate by a metal roll is illustrated. More specifically, the embossing plate is produced as follows.

Figure 7:
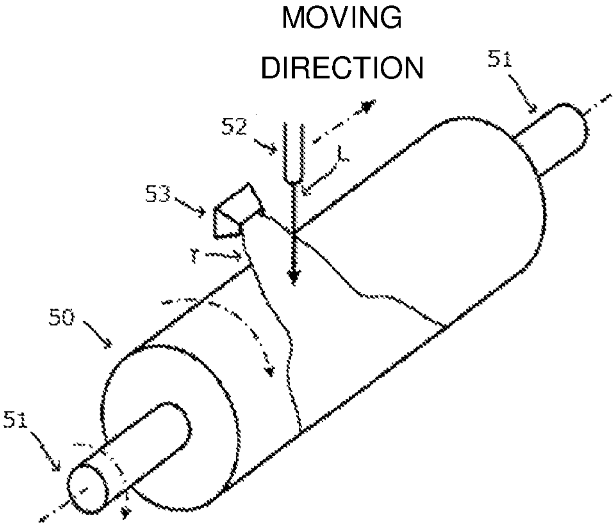
FIG. 7 is a view showing one scene of a step of producing a plate by laser light, which is one example of step S16 in FIG. 5.

First, a metal roll 50 to be finally an embossing plate 50 as shown in FIG. 7 is prepared. As the metal roll 50, a metal roll with a copper layer formed by being plated on a surface of a hollow iron cylinder with rotation drive shaft (shat) 51 at both axial end portions is cited, for example. The surface of the metal roll 50 is roughened by being grounded with a grind stone or the like, and reduction in engraving efficiency due to mirror reflection of engraving laser light is preferably suppressed.

As schematically shown in FIG. 7, by using a laser light direct engraving machine, the surface of the prepared metal roll 50 is engraved based on the height data for each of the coordinates created in step S15.

The metal roll 50 drives by an electric motor via the rotation drive shaft 51, and rotates around the rotation drive shaft 51. At this time, the surface of the metal roll 50 is scanned by light L emitted from a laser head 52. As one example of the laser light L, a fiber laser light with an oscillation wavelength of 1024 nm, a spot diameter of 10 μm, and output of 360 W is cited.

When scanning the surface of the metal roll with the laser light L, On-OFF switching of the laser light (switching of irradiation and non-irradiation) is performed for each of the coordinates (x, y), according to a height of the height H (x, y) created in step S15, and in the irradiated position, the recess is formed by evaporation of the metal by laser light irradiation of one time (The recess of the plate corresponds to the projection of the decorative material. Therefore, a number of irradiation times of the laser light can be made smaller at the coordinates with a larger height.). In the condition of the laser light illustrated in the above, the recess with a depth of 10 μm is formed by laser light irradiation of one time.

Scanning to the metal roll surface by the laser light like this is repeated about 10 times, for example. In order to prevent the evaporated metal from being powder and remaining on or adhering to the surface of the metal roll 50, laser light irradiation is preferably performed in a state in which an engraving liquid T is sprayed to the laser light irradiation region on the surface of the metal roll from an engraving liquid ejection port 53.

In this way, by finely engraving the surface of the metal roll 50 with laser light, it is possible to obtain the metal roll including the shape capable of forming the surface shape of the first principal surface.

After the recesses and projections are engraved in this way, the engraving liquid is cleaned, and thereafter, residue of the metal adhering to the surface of the metal roll 20 is preferably removed by performing electrolytic polishing. The surface of the metal roll 20 is preferably plated with hard chrome plating or the like to improve durability. A thickness of the plating layer is normally about 10 μm.

By the above steps S11 to S16, the plate 50 (decorative material forming mold, the embossing plate in the present embodiment) including the shape complementary to the recess and projection shape on the first principal surface of the decorative material can be obtained.

<<S17: Shaping>>

In a shaping step (S17), a decorative material is produced by performing embossing to the decorative material before the first principal surface is formed, by using the plate (embossing plate) produced in steps S11 to S16.

Embossing can be performed by an appropriate known method, and there is no particular limitation. A temperature and pressure during embossing can be properly adjusted according to the material of the decorative material, and is substantially 140 to 180° C. and 10 to 50 kg/cm$^2$ when the base material and the transparent resin layer of the decorative material is made of polyolefin.

A typical method for embossing is, for example, as follows.

First, the embossing plate is pressed against the surface of the softened resin base material to form the recess and projection pattern on the embossing plate surface on the base material surface. The resin base material is solidified by cooling or light irradiation to fix the recess and projection pattern on the resin base material. Thereafter, the resin on which the recess and projection pattern is formed is separated from the embossing plate.

[Production Method for Decorative Material]

A production method of the decorative material of the present invention comprises steps (1) and (2) described below.

(1) A step of performing shaping onto a single layer of a base material selected from a plastic film or a complex of the plastic film and paper, or a laminate comprising the base material with an embossing plate, and obtaining a decorative material in which a plurality of independent closed regions each comprising a groove-shaped parallel recess and projection pattern are arranged on a first principal surface side, and in at least some of the closed regions, depths of recesses of groove-shaped parallel recess and projection patterns vary in the closed regions.

(2) A step of coating a surface on the first principal surface side of the decorative material obtained in the (1) with a filling ink comprising a coloring agent and a binder resin, and thereafter scraping out the filling ink.

The decorative material obtained through the steps (1) and (2) described above can give an excellent three-dimensional effect, has a large change in shadowed parts depending on the observation angle, and therefore is extremely excellent in design aesthetics.

Furthermore, in the production method of the decorative material of the present invention, the decorative material obtained in step (1) preferably satisfies the aforementioned preferable embodiment of the decorative material of the present invention. For example, the first principal surface of the decorative material obtained in step (1) preferably satisfies one or more selected from (a) to (d) described above.

An embossing condition in step (1) is not particularly limited, and, for example, the conditions described in step S17 described above are cited.

Furthermore, step (2) preferably includes steps (2-1) to (2-3) described below.

(2-1) A step of causing the decorative material obtained in step (1) to along at least a part of the surface of the roll having a circular section so that the first principal surface side of the decorative material faces an opposite side to the roll.

(2-2) A step of coating the surface on the first principal surface side of the decorative material obtained in step (1) with the filling ink containing a coloring agent and a binder resin.

(2-3) A step of pressing a blade against the first principal surface side of the decorative material and scraping out the filling ink adhering to the first principal surface side.

In step (2-1), as a material of the roll, metal, rubber, resin and the like are cited, and among them, rubber and resin are preferable, and rubber is more preferable. By adopting a material having cushioning properties such as rubber and resin as the material of the roll, it becomes easy to prevent the recesses from being excessively filled with the coloring agent.

The filling ink in step (2-2) contains a coloring agent and a binder resin, and preferably contains a solvent as necessary. Note that there is a tendency that the higher the viscosity of the filling ink, the harder it is for the ink in the recess to be scraped out, whereas the lower the viscosity of the filling ink, the easier it is for the ink in the recess to be scraped out. Consequently, the viscosity of the filling ink is preferably adjusted properly according to a desired filling amount.

Note that the coloring agent of the filling ink is preferably a dark color coloring agent.

As means for scraping out the filling ink in step (2-3), a scraping blade such as a doctor blade is preferably used.

An angle of the blade with respect to the first principal surface of the decorative material is preferably substantially perpendicular. Substantially perpendicular means a range of 90±10 degrees, preferably 90±5 degrees, and more preferably 90±3 degrees. Note that a case of being inclined to a flow direction side of the decorative material is described as plus, and a case of being inclined to an opposite direction to the flow direction of the decorative material is described as minus.

Further, as a material of the blade, metal, rubber, resin and the like are cited, and among them, metal is preferable.

In step (2-3), pressure to apply the blade to the decorative material can be properly adjusted within a range in which ink streaks and unevenness do not occur.

EXAMPLES

Next, the present invention will be described in more detail based on examples, but the present invention is not limited by the examples in any way.

1. Evaluation

1-1. Three-Dimensional Effect

Arbitrary twenty adults were asked to observe the decorative material obtained in examples and comparative examples from various directions under fluorescent lighting and visually evaluate whether or not they felt a three-dimensional effect.

AA: Eighteen people or more answered that the three-dimensional effect was good.

A: Fifteen to seventeen people answered that the three-dimensional effect was good.

B: Eleven to fourteen people answered that the three-dimensional effect was good.

C: Ten people or less answered that the three-dimensional effect was good.

1-2. Difference in Gloss (Shadowed Parts) Depending on Observation Direction Arbitrary twenty adults were asked to observe the decorative material obtained in examples and comparative examples from various directions under fluorescent lighting and visually evaluate the difference in gloss (shadowed parts) of each of the observation regions depending on the observation direction.

AA: Eighteen people or more answered that the difference in gloss (shadowed parts) was large.

A: Fifteen to seventeen people answered that the difference in gloss (shadowed parts) was large.

B: Eleven to fourteen people answered that the difference in gloss (shadowed parts) was large.

C: Ten people or less answered that the difference in gloss (shadowed parts) was large.

1-3. Natural Texture

Arbitrary twenty adults were asked to observe the decorative material obtained in examples and comparative examples from various directions under fluorescent lighting and visually evaluate feeling of a natural object (natural texture).

AA: Eighteen people or more answered that there was a natural texture.

A: Fifteen to seventeen people answered that there was a natural texture.

B: Eleven to fourteen people answered that there was a natural texture.

C: Ten people or less answered that there was a natural texture.

1-4. Tactile Impression

Arbitrary twenty adults touched the decorative material obtained in examples and comparative examples with their fingers and evaluated the tactile impression. With three things that are "recess and projection feeling", "change in tactile impression in the surface" and "synchronization of tactile impression and design" used as the evaluation criteria, whether the tactile impression is good or bad was evaluated by combining the three criteria.

AA: Eighteen people or more answered that the tactile impression was good.

A: Fifteen to seventeen people answered that the tactile impression was good.

B: Eleven to fourteen people answered that the tactile impression was good.

C: Ten people or less answered that the tactile impression was good.

2. Production of Embossing Plate

Embossing plates A to C with hard chrome-plating applied to the surfaces were produced in conformity with steps S11 to S16 of the description text. The plates A to C were produced by changing the laser light irradiation conditions respectively so that the recess and projection patterns in each of the closed regions after embossing were as in Table 1. Furthermore, in the plate C, the entire surface was constituted of the same groove-shaped parallel recess and projection pattern and did not have a closed region.

3. Production of Decorative material

Example 1

On a colored base material (white polypropylene film having a thickness of 60 μm), a solid printing layer having a thickness of 1 μm made of a grayish ink was formed by gravure printing.

Next, an adhesive layer (polyester resin, thickness: 5 μm) was formed on the solid printing layer. Next, on the adhesive layer, a transparent resin layer (transparent polypropylene resin sheet, thickness: 80 μm) was laminated by an extruded laminating method.

Next, the transparent resin layer was heated and brought into a softened state, embossing treatment was applied from a surface on a transparent resin layer side by using the embossing plate A produced in the above described "2", and a recess and projection shape was formed on the surface on the transparent resin layer side (surface on the first principal surface side). The measurement value of the recess and projection shape by image analysis is shown in Table 1.

Furthermore, after the surface on the transparent resin layer side (surface on the first principal surface side) was coated with a black-brown filling ink, the doctor blade was pressed against the first principal surface to be perpendicular to the first principal surface, the filling ink was scraped out, and the decorative material of example 1 was obtained.

Example 2

The decorative material of example 2 was obtained in the same way as in example 1 except that the embossing plate A was changed to the embossing plate B.

Comparative Example 1

The decorative material of comparative example 1 was obtained in the same way as in example 1 except that the embossing plate A was changed to the embossing plate C.

Comparative Example 2

The decorative material of comparative example 2 was obtained in the same way as in example 1 except that the step of coating the surface on the transparent resin layer side (surface on the first principal surface side) with the filling ink was not performed. The decorative material of comparative example 2 corresponds to the decorative material in which the recesses of the decorative material of example 1 are not filled with the coloring agent.

TABLE 1

| | | Example 1 | Example 2 | Comparative example 1 | Comparative example 2 |
|---|---|---|---|---|---|
| | Embossing plate | A | B | C | A |
| Recesses and projections in each of closed regions | Ratio of closed regions in which depths of recesses vary in the closed regions | 99% or more | | 0% | Same as example 1 |
| | Ratio of closed regions in which $Z_{max}/Z_{min}$ is 2.0 or more | 99% or more | | 0% | |
| | Width X of recess (μm) | Select at random from 80 μm and 180 μm | Fixed to 110 μm | Fixed to 110 μm | |
| | Ratio of width Y of projection and width X of recess [Y/X] | Select at random from group consisting of 1.0, 1.5 and 2.0 | Fixed to 1.0 | Fixed to 1.0 | |
| | Depth Z of recess (μm) | Vary in a range of 10 to 80 μm | Vary in a range of 10 to 80 μm | Fixed to 60 μm | |
| | Extending direction of recess and projection pattern | Select at random from group consisting of 15 degrees, 30 degrees, 45 degrees, 60 degrees, 75 degrees and 90 degrees | | | |
| Presence or absence of coloring agent in recesses | | Present | Present | Present | Absent |
| Ratio of combinations of closed regions satisfying (a) | | 50% or more | 0% | 0% | 50% or more |
| Ratio of combinations of closed regions satisfying (b) | | 50% or more | 0% | 0% | 50% or more |
| Ratio of combinations of closed regions satisfying (c) | | 70% or more | 70% or more | 0% | 70% or more |
| Ratio of combinations of closed regions satisfying (d) | | 99% or more | | | |
| Ratio of combinations of closed regions satisfying (e) | | 99% or more | | | — |
| Average area of closed regions ($mm^2$) | | 700 $mm^2$ | 700 $mm^2$ | 700 $mm^2$ | 700 $mm^2$ |

TABLE 1-continued

| | | Example 1 | Example 2 | Comparative example 1 | Comparative example 2 |
|---|---|---|---|---|---|
| Evaluation | Three-dimensional effect | AA | A | B | B |
| | Difference in gloss | AA | A | B | B |
| | Natural texture | AA | A | B | B |
| | Tactile impression | AA | A | B | B |

Note that (a) to (e) in Table 1 mean the following configurations.

(a) When a width of a recess of a groove-shaped parallel recess and projection pattern in an arbitrary closed region A is defined as $X_A$, and a width of a recess of a groove-shaped parallel recess and projection pattern in an arbitrary closed region B adjacent to the closed region A is defined as $X_B$, $X_A \neq X_B$ is established.

(b) When a width of a projection of the groove-shaped parallel recess and projection pattern in the arbitrary closed region A is defined as $Y_A$, and a width of a projection of the groove-shaped parallel recess and projection pattern in the arbitrary closed region B adjacent to the closed region A is defined as $Y_B$, the $X_A$, the $Y_A$, the $X_B$, and the $Y_B$ satisfy $Y_A/X_A \neq Y_B/X_B$.

(c) When an average of depths of recesses of the groove-shaped parallel recess and projection pattern in the arbitrary closed region A is defined as $Z_A$, and an average of depths of recesses of the groove-shaped parallel recess and projection pattern in the arbitrary closed region B adjacent to the closed region A is defined as $Z_B$, $Z_A \neq Z_B$ is established.

(d) When an extending direction of the groove-shaped parallel recess and projection pattern in the arbitrary closed region A is defined as $D_A$, and an extending direction of the groove-shaped parallel recess and projection pattern in the arbitrary closed region B adjacent to the closed region A is defined as $D_B$, the $D_A$ and the $D_B$ are non-parallel with each other.

(e) When a filling amount per unit area of the coloring agent that is filled in the recesses of the groove-shaped parallel recess and projection pattern in the arbitrary closed region A is defined as $W_A$, and a filling amount per unit area of the coloring agent that is filled in the recesses of the groove-shaped parallel recess and projection pattern in the arbitrary closed region B adjacent to the closed region A is defined as $W_B$, $W_A \neq W_B$ is established.

As shown in Table 1, it can be confirmed that the decorative materials of the examples can give an excellent three-dimensional effect, have large change in shadowed parts depending on the observation angle, and can give advanced design aesthetics. Furthermore, it can be confirmed that the decorative materials of the examples are also excellent in tactile impression.

REFERENCE SIGNS LIST

10*a*, 10*b*, 10*c*, 10*d*, 10*e*, 10*f*, 10*g*, 10*h*, 10*i*, 10*j*, 10*k*: Closed region
21: Recess
22: Projection
30: Coloring agent
100: Decorative material
50: Plate (embossing plate, metal roll)
51: Rotation drive shaft
52: Laser head
53: Engraving liquid ejection port

The invention claimed is:

1. A decorative material, wherein on a first principal surface side of the decorative material, a plurality of independent closed regions are arranged, wherein:

the plurality of independent closed regions is formed on a first principal surface side of the decorative material, a groove-shaped parallel recess and a projection pattern is formed inside each of the independent closed regions, the groove-shaped parallel recess and projection pattern of the decorative material is configured by a plurality of recesses and a plurality of projections of the closed regions, each recess of the groove-shaped parallel recesses of the closed regions is a straight line, the recesses in each of the closed regions is parallel with one another, depths of recesses of the groove-shaped parallel recess and projection patterns of the closed regions vary in at least some of the closed regions, and a coloring agent is filled in at least part in a depth direction of recesses of the groove-shaped parallel recess and projection pattern in each of the closed regions, and wherein at least some of adjacent closed regions satisfy (b) and (d), as follows, and at least one of (a) and (c), as follows:

(a) when a width of a recess of a groove-shaped parallel recess and projection pattern in an arbitrary closed region A is defined as $X_A$, and a width of a recess of a groove-shaped parallel recess and projection pattern in an arbitrary closed region B adjacent to the closed region A is defined as $X_B$, $X_A \neq X_B$ is established;

(b) when a width of a projection of the groove-shaped parallel recess and projection pattern in the arbitrary closed region A is defined as $Y_A$, and a width of a projection of the groove-shaped parallel recess and projection pattern in the arbitrary closed region B adjacent to the closed region A is defined as $Y_B$, the $X_A$, the $Y_A$, the $X_B$, and the $Y_B$ satisfy $Y_A/X_A \neq Y_B/X_B$;

(c) when an average of depths of recesses of the groove-shaped parallel recess and projection pattern in the arbitrary closed region A is defined as $Z_A$, and an average of depths of recesses of the groove-shaped parallel recess and projection pattern in the arbitrary closed region B adjacent to the closed region A is defined as $Z_B$, $Z_A \neq Z_B$ is established; and (d) when an extending direction of the groove-shaped parallel recess and projection pattern in the arbitrary closed region A is defined as $D_A$, and an extending direction of the groove-shaped parallel recess and projection pattern in the arbitrary closed region B adjacent to the closed region A is defined as $D_B$, the $D_A$ and the $D_B$ are non-parallel with each other.

2. The decorative material according to claim 1, wherein a ratio of closed regions in which the depths of the recesses of the groove-shaped parallel recess and projection patterns vary in the closed regions to all the closed regions is 80% or more based on a number of closed regions.

3. The decorative material according to claim 1, wherein an angle formed by the $D_A$ and the $D_B$ is 10 to 90 degrees.

4. The decorative material according to claim 1, wherein an extending direction of the groove-shaped parallel recess and projection pattern in each of the closed regions is arranged at random in a first principal surface, and the extending direction of the groove shaped parallel recess and projection pattern in adjacent closed regions differ from each other.

5. The decorative material according to claim 1, wherein at least some of adjacent closed regions satisfies (e) as follows:

(e) when a filling amount per unit area of the coloring agent that is filled in recesses of a groove-shaped parallel recess and projection pattern in an arbitrary closed region A is defined as $W_A$, and a filling amount per unit area of the coloring agent that is filled in recesses of a groove-shaped parallel recess and projection pattern in an arbitrary closed region B adjacent to the closed region A is defined as $W_B$, $W_A \neq W_B$ is established.

6. The decorative material according to claim 1, wherein when a width of the recess of the groove-shaped parallel recess and projection pattern is defined as X, a width of a projection of the groove-shaped parallel recess and projection pattern is defined as Y, and a depth of the recess of the groove-shaped parallel recess and projection pattern is defined as Z, the X is 20 to 250 μm, the Y is 20 to 250 μm, and the Z is 5 to 120 μm.

7. The decorative material according to claim 1, wherein an average area of the closed regions is 300 to 2000 $mm^2$.

* * * * *